Aug. 5, 1958 W. R. GOEHNER ET AL 2,846,518

MEANS FOR ERASING A MAGNETIC RECORD

Filed Oct. 5, 1955

INVENTORS W. R. GOEHNER
C. M. TARIS
BY V. P. Priolo
ATTORNEY

United States Patent Office 2,846,518

Patented Aug. 5, 1958

2,846,518

MEANS FOR ERASING A MAGNETIC RECORD

William R. Goehner, Harding Township, Morris County, and Charles M. Taris, Cranford, N. J., assignors to Bell Telephone Laboratories, Incorporated, New York, N. Y., a corporation of New York Application October 5, 1955, Serial No. 538,713

5 Claims. (Cl. 179—100.2)

This invention relates to means for erasing a magnetic record by exposing said record to an alternating magnetic field and then slowly reducing the intensity of said field, and more particularly to means for controlling the decay of said alternating magnetic field and the intensity of the flux distribution at all locations along the record medium after erasure of the record has been completed.

Magnetic recording facilities are provided in the telephone plant for furnishing short repetitive announcements such as are required for weather announcing service and the interception of telephone calls to vacant and unassigned numbers. They are also provided in telephone answering devices which automatically transmit a recorded message to and record a message from a calling party. In these facilities it has been found desirable to dispose the record medium on the surface of a rotating cylinder and cause the record to occupy a helical track on said surface.

Difficulties are encountered in erasing this record with a separate erase head in accordance with conventional wire and tape recorder practice. It is very difficult, mechanically, to make the erase and record-reproduce heads trace identical helical paths during the entire operating cycle because there is of necessity a physical displacement between them. While it is conventional commercial practice to erase an old message and simultaneously record a new one, some applications in telephone work require the use of a separate erase cycle. Moreover, when a conventional single track erase head is used, the erase operation requires as much time as a full recording cycle.

The foregoing difficulties can be overcome by erasing with a magnetic structure wide enough to extend completely across the surface of the record medium. Such a structure, which employs alternating current at a frequency of 60 cycles and accomplishes complete erasure in one revolution of the record cylinder, is included in the bulk demagnetizer disclosed in patent application Serial No. 250,860, filed by J. Z. Menard on October 11, 1951, which has since matured into Patent 2,733,300, granted January 31, 1956.

With the device referred to above the magnetic record is erased by moving a large erase solenoid, energized by 60 cycles per second current, close to the rotating magnetic record cylinder or drum. After the record has been completely erased the erase coil is withdrawn a predetermined distance from the drum before it is deenergized. It is necessary to withdraw the coil before removing the current to avoid leaving a line of magnetization or "noise bar" of intolerable magnitude across the face of the record medium. If the erase structure were not withdrawn the section of record medium under the influence of the erase structure at the time it was deenergized would exhibit excessive noise in comparison with the remainder of the record medium which was subjected to the normal alternating-current erase.

The mechanism necessary for moving a large solenoid has been included successfully in devices such as the weather announcing machine. There are certain equipments, however, in which it is desirable to avoid the use of moving erase coils. Such an equipment is the automatic telephone answering set which, of necessity, must be as small, compact and maintenance-free as possible since it is installed in the subscriber's home or office.

A structure which provides means for achieving neutralization erase and demagnetization of a rotating magnetic record medium with a stationary erase coil is disclosed in patent application Serial No. 443,664, filed by C. M. Taris and F. J. Woolam on July 15, 1954, which has since matured into Patent 2,816,176, granted December 10, 1957.

With this structure the magnetic record is erased by applying erase current to a stationary coil disposed adjacent the rotating magnetic record during at least one complete revolution of the record, and the decay of the magnetic field is then controlled by inserting a nonlinear resistor having a positive temperature-resistance characteristic in series between the erase coil and the source of erase current and a nonlinear resistor having a negative temperature-resistance characteristic in shunt with the erase coil. This structure produces a line of magnetization or "noise bar" of tolerable maximum magnitude.

Studies made in an effort to decrease the magnitude of the line of magnetization referred to above have disclosed that the intensity of the erase coil flux distribution is not uniform along the record medium and that the recorded noise due to erase coil current cut-off reaches a maximum value on that part of the medium which passes over the erase coil in the region of the ends of the erase coil core. These maximum values are due to a high concentration of flux at the ends of the erase coil core.

It has been found that the flux density at the ends of the record medium can be decreased by tapering the ends of the erase coil core to provide a maximum air gap between core and record medium at the ends of the core. The optimum taper is one which will provide uniform flux density at all locations along the record medium. The resulting "noise bar" will be of approximately the same magnitude at all locations along the medium and, with the elimination of the high flux density at the ends of the core, will be of relatively lower average magnitude.

The effect of the high flux density at the ends of the erase coil core may also be diminished appreciably by using a core having a length greater than the width of the record medium surface. This is objectionable, however, in a device such as the telephone answering set wherein space is at a premium and it is desirable that the erasing means be held within the maximum dimensions of the record medium.

It is an object of this invention to achieve neutralization erase and demagnetization of a rotating magnetic record medium with a stationary erase coil.

It is a further object of this invention to control the decay of the alternating magnetic field provided by the stationary coil and the intensity of the flux distribution at all locaions along the record medium after erasure of the record has been completed, so that the "noise bar" which results from erase coil current cut-off will be of uniform and relatively low magnitude.

In accordance with a feature of this invention the over-all length of the erase coil core and the width of the record medium are substantially equal and the end portions of the core are tapered in such manner that the spacing between core and record medium is at a maximum at the ends of the core.

In accordance with another feature of the invention the erase coil is shunted during the entire erase cycle with a resistor having a fixed value, and a nonlinear resistor having a positive temperature-resistance characteristic is inserted in series between the erase coil and the source of erase current after erasure of the record has been completed.

This and other features of the invention will be more clearly understood from the following detailed description and the accompanying drawings in which.

Figures 1, 2, 3:
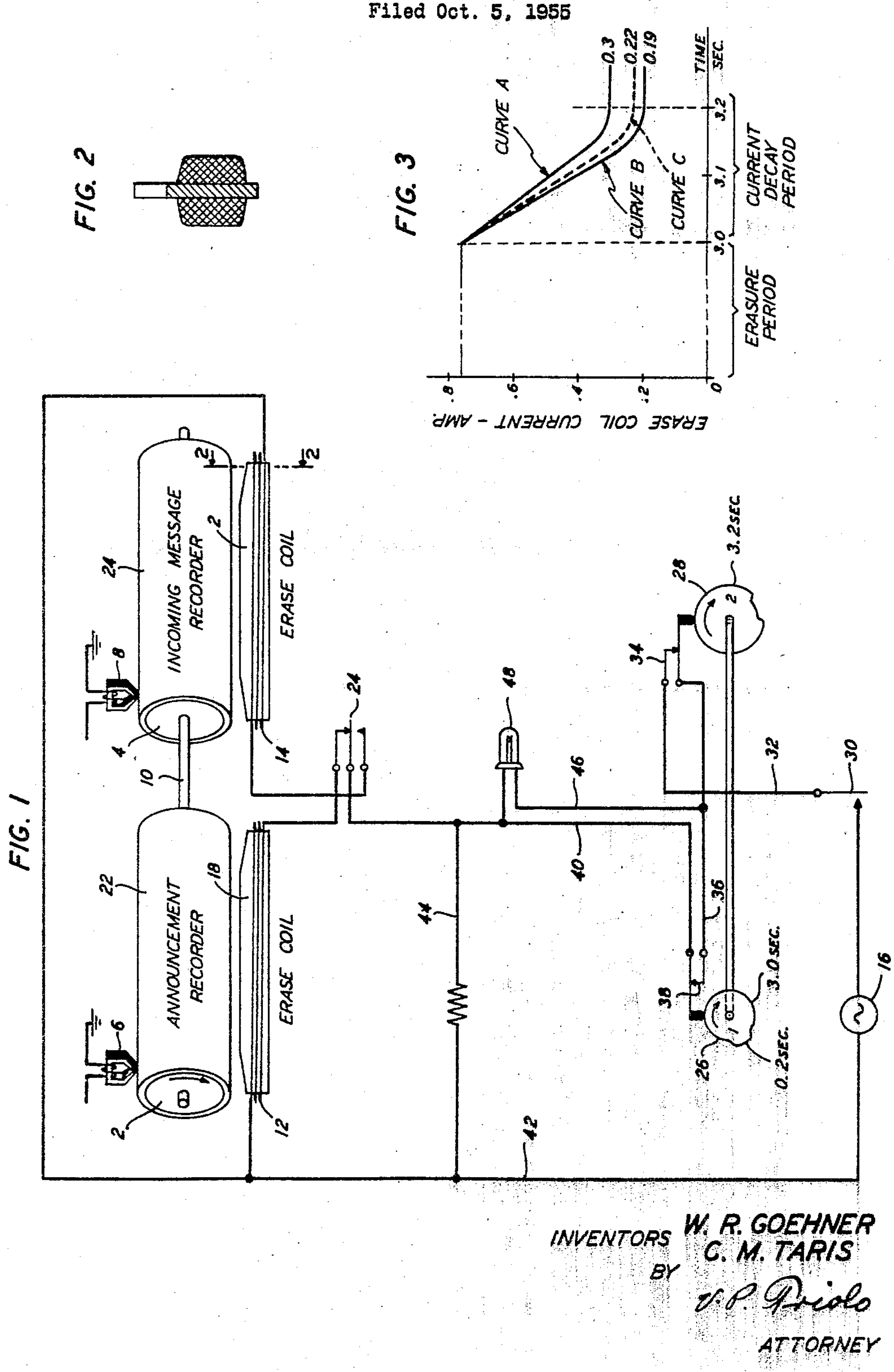
Fig. 1 is a schematic of the electrical control system for energizing the erase coil and controlling the decay of the erase current.
Fig. 2 is a sectional view of the erase coil and core taken on the line 2—2 of Fig. 1.
Fig. 3 is a diagram showing the rate of decay of the erase current after the erase cycle has been completed.

Referring now to the accompanying drawings the structure comprising the announcement record drum 2, the incoming message record drum 4 and the magnetic record-reproduce heads 6 and 8 may be similar to that employed in the automatic telephone answering device disclosed in patent application Serial No. 331,157, filed by C. R. Keith and C. A. Nickerson on January 14, 1953, which has since matured into Patent 2,761,899, granted September 4, 1956.

As shown in application Serial No. 331,157, drums 2 and 4 are supported by shaft 10 in such manner as to be free to rotate on the shaft independently or be driven independently by clutch means attached to the shaft, and means are provided for simultaneously moving the record-reproduce head directly associated with the rotating drum.

Erase coils 12 and 14 are energized by current from a 60-cycle current source 16. The over-all lengths of the erase coil cores 18 and 20 are equal to the widths of the record media 22 and 24 respectively. The cores may be made of conventional magnetic core material such as magnetic iron or silicon steel, and are tapered at the ends. The optimum value for the taper may be determined by establishing the maximum width of the air gap between the center portion of the record medium and the erase core which will assure complete erasure of a recorded signal, measuring the noise bar at said center portion of the record medium after erasure has been completed, and selecting a taper which will produce a noise bar at the ends of the record having a value approximately the same as that measured at the center portion of the record. The optimum taper in a preferred embodiment of this invention in which the over-all length of the core is 5⅛ inches and the air gap between medium and core is of the order of .015 to .030 inch was found to be ⅝ inches long and cut at an angle of approximately 2 degrees and 18 minutes to provide a maximum increase in the air gap at the ends of the core of 0.025 inch. In the embodiment of the invention shown in Figs. 1 and 2 the surfaces of the core which face the record medium, namely the center portion which is substantially parallel to the axis of the record medium, and the tapered ends are substantially flat, rectangular and ⅛-inch wide.

Switch 24 may be manually or automatically operated to select the coil which is to be energized. The erase cycle is measured by means of cams 26 and 28. Cam 26 comprises two segments, the larger one corresponding to the time required for either of the record drums 2 and 4 to rotate at least one complete revolution and thereby accomplish complete erasure of the magnetic record, and the smaller one corresponding to the time required to decay the erase current in the erase coil. Cam 28 comprises a segment which corresponds to the total time of the erase and decay cycle, that is, the total time required for one complete revolution of cam 26. Cams 26 and 28 may be mounted on the same shaft and may be driven by the means which drives the shaft 10.

On closing switch 30, manually or automatically, erase current from the source 16 is applied to either coil 12 or 14 over the path including conductor 32, closed switch 34, conductor 36, closed switch 38, conductor 40, switch 24 and conductor 42. Either coil 12 or 14 is permanently shunted by resistor 44. After the record drum related to the energized coil has made at least one complete revolution, the record thereon will have been completely erased and cam 26 will operate to open switch 38. Erase current is now applied to the erase coil over the path including conductor 32, switch 34, conductor 36, conductor 46, nonlinear resistor 48, conductor 40, switch 24 and conductor 42. After cam 26 has made a complete revolution, cam 28 operates to open switch 34 and thereby open the path over which current is supplied to the erase coil.

The nonlinear resistor 48 has a positive temperature-resistance characteristic, and its range of resistance has been extended, as in the structure disclosed in patent application Serial No. 443,664 referred to hereinbefore, by placing a resistor in parallel with the erase coil. While the parallel element shown in the above-identified application is a nonlinear resistor with a negative temperature-resistance characteristic, it has been found that when using an erase core with tapered ends the nonlinear resistor may be replaced with a resistor of fixed value (resistor 44) disposed permanently across the erase coil, without causing a noticeable change in the amplitude of the recorded noise. This feature is especially attractive since it eliminates the need for a make contact on switch 38 and provides a more economical structure.

In the particular embodiment of the invention shown in Fig. 1 the time required by each of the record drums to complete one revolution is three seconds. The time interval between the completion of one revolution of the record drum and the establishment of the final steady state value of erase current is two-tenths of a second or the time required by the record drum to complete one-fifteenth of a revolution.

Curves A and B of Fig. 3 show the rate of erase current decay obtained by employing the structures disclosed in patent application Serial No. 443,664. Curve C shows the rate of erase current decay obtained by employing the present invention. It will be seen that substantially the same reduction of the erase current can be achieved in the same time interval, namely two-tenths of a second, with the combination of a tapered erase coil core, fixed shunt resistor and nonlinear series resistor.

Element 48 need not be restricted to nonlinear resistors. It may be a nonlinear impedance device having a positive temperature coefficient of resistance (its impedance increases with time) such as a nonlinear semiconductor.

It is to be understood that the above-described arrangements are illustrative of the application of the principles of the invention. Other arrangements may be devised by those skilled in the art without departing from the spirit and scope of the invention.

What is claimed is:

1. Means for erasing a rotating magnetic record medium comprising a stationary magnetic core, an energizing coil wound thereon, said core comprising a pole-piece facing said medium and extending across the width of the record bearing surface thereof, said pole-piece including a center portion disposed a predetermined distance from said record bearing surface and substantially parallel to the axis thereof, and end portions tapered to diverge away from said record bearing surface in such manner that the distance between said pole-piece and said record bearing surface will be greatest at the width defining edges of said record bearing surface.

2. In a bulk demagnetizer for a rotating magnetic record medium, a magnetic pole-piece, an energizing coil wound thereon, said pole-piece comprising a face the over-all length of which is substantially equal to the width of the record bearing surface of said medium, said face including a center portion disposed a predetermined distance from said record bearing surface and substantially parallel to the axis thereof and end portions tapered in such manner as to gradually increase the gap between said face and said record bearing surface to provide a maximum gap at the width defining edges of said record bearing surface.

3. Means for erasing a rotating magnetic record medium comprising a stationary magnetic core, a coil wound thereon, said core comprising a pole-piece facing said medium and extending across the width of the record bearing surface thereon, said pole-piece including a center portion disposed a predetermined distance from said record bearing surface and substantially parallel to the axis thereof and end portions tapered to diverge away from said record bearing surface, a source of alternating erase current, a resistor, a nonlinear impedance device having a positive temperature coefficient of resistance, a closed first current path including said coil and said resistor connected in parallel and said source of current, a second current path including said source of current, said coil and said resistor connected in parallel and said nonlinear impedance device, means for rendering said first current path ineffective and said second current path effective after a predetermined period of time, and means for rendering said second current path ineffective after a second predetermined period of time.

4. Means for erasing a rotating magnetic record medium comprising a stationary magnetic core, a coil wound thereon, said core comprising a pole-piece facing said medium and extending across the width of the record bearing surface thereof, said pole-piece including a center portion disposed a predetermined distance from said record bearing surface and substantially parallel to the axis thereof and end portions tapered to diverge away from said record bearing surface, a source of alternating erase current, a resistor, a nonlinear resistor having a positive temperature coefficient of resistance, means for connecting said coil directly to said source of alternating current and said resistor in shunt with said coil, means for maintaining said direct connection for a first predetermined period of time and then inserting said nonlinear resistor in series with said coil and said source of alternating current for a second predetermined period of time.

5. Means for erasing a rotating magnetic record medium compirsing a stationary magnetic core, a coil wound thereon, said core comprising a pole-piece facing said medium and extending acros the width of the record bearing surface thereof, said pole-piece including a center portion disposed a predetermined distance from said record bearing surface and substantially parallel to the axis thereof and end portions tapered to diverge away from said record bearing surface, a source of alternating erase current, a resistor, a nonlinear resistor having a positive temperature coefficient of resistance, a closed first current path including said coil and said resistor connected in parallel and said source of current, a second current path including said source of current, said coil and said resistor connected in parallel and said nonlinear resistor, means for rendering said first current path ineffective and said second current path effective after a predetermined period of time, means for rendering said second current path ineffective after a second predetermined period of time, the characteristics of said resistors being such as to reduce the erase current substantially 75 percent within the time required by said rotating magnetic record to complete one-fifteenth of a revolution.

References Cited in the file of this patent

UNITED STATES PATENTS

| | | |
|---|---|---|
| 2,429,792 | Begun | Oct. 28, 1947 |
| 2,498,423 | Howell | Feb. 21, 1950 |
| 2,638,507 | Lombardi | May 12, 1953 |